MARY J. DeLEON.
Cooking Apparatus.

No. 140,253.                                          Patented June 24, 1873.

Witnesses
D. Smith
T. A. Devine

Inventor
Mary Jones De Leon,
By her Attorney
T. H. Opperman.

UNITED STATES PATENT OFFICE.

MARY JONES DE LEON, OF BALTIMORE, MARYLAND.

IMPROVEMENT IN COOKING APPARATUS.

Specification forming part of Letters Patent No. 140,253, dated June 24, 1873; application filed January 2, 1873.

*To all whom it may concern:*

Be it known that I, MARY JONES DE LEON, of Baltimore, in the county of Baltimore and State of Maryland, have invented certain new and useful Improvements in Apparatus for Heating Food; and do hereby declare the following to be a full, clear, and exact description thereof, reference being had to the accompanying drawing and to the letters of reference marked thereon.

The nature of my invention consists in the construction and arrangement of an apparatus for heating food by dry heat and steam at one time, and which apparatus may also be used for cooking, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1:
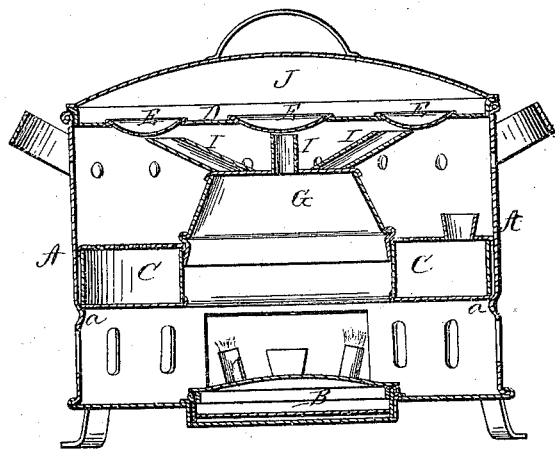
Figure 2:
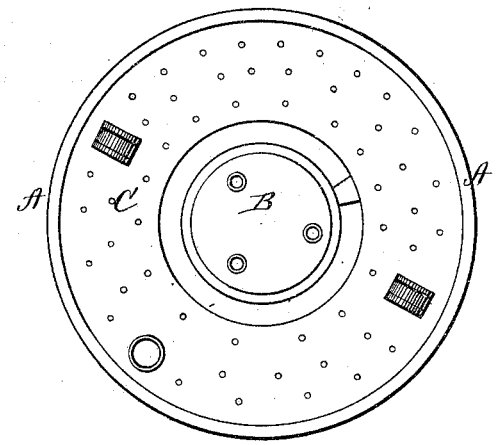
Figure 3:
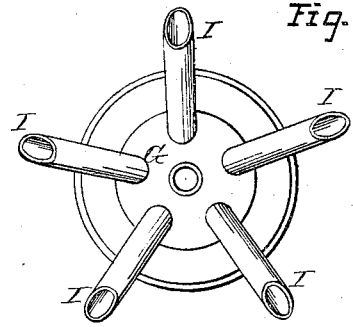

Figure 1 is a longitudinal vertical section of my entire apparatus. Fig. 2 is a plan view of the same with the lid and a part of the interior arrangement removed; and Fig. 3 shows the device by which the dry heat is carried to the points where desired.

A represents the exterior vessel, made in circular or other suitable form, of any desired dimensions, and provided in the center of its bottom with a recess or seat for the reception of the lamp B. A suitable distance above the lamp B, around the interior of the vessel A, is made a ledge or offset, $a$, upon which the water-reservoir C is placed. This reservoir fits within the vessel A, and is made of annular form, the central opening being just of such size that the lamp B may be placed and supported therein when desired. The top of the reservoir C is perforated, as shown in Fig. 2, for the escape of the steam generated within the reservoir from the heat from the lamp. On the top edges of the vessel A is supported a large plate, D, in which are made a series of holes for the reception of the smaller plates E containing the food to be heated or kept hot.

When the lamp B is used in the bottom of the vessel A, the central aperture in the reservoir C is covered by a conical cap, G, from the top of which a series of pipes, I I, lead, one to the under side of each of the plates E, thus conveying the heat from the lamp directly to the bottom of each of said plates. At the same time as the dry heat from the lamp is used, the steam arising from the water in the reservoir relieves the dryness of the heat, and prevents the articles of food on the plates E from becoming scorched or otherwise injured.

By placing the lamp B on its seat in the reservoir, and substituting a solid plate for the plate D, this apparatus may also be used for cooking, if so desired.

The whole apparatus is covered by a lid, J.

Having thus fully described my invention, what I claim as new, and desire to secure by Letters Patent, is—

1. In an apparatus for heating and cooking food, the combination of a lamp and the annular water-reservoir, having a perforated cover, with the plate or plates containing the articles to be heated, whereby said articles are subjected to the combined action of steam and dry heat, while the latter may be used for cooking purposes, by placing the lamp on its seat on the water-reservoir, substantially in the manner herein set forth.

2. The combination of the vessel A, lamp B, reservoir C, plates D and E, conical cap G, and tubes I I, all constructed and arranged substantially as and for the purposes herein set forth.

In testimony whereof I have hereunto signed my name.

MARY JONES DE LEON.

Witnesses:
EDM. F. BROWN,
MARIA DE LEON.